United States Patent [19]
Pemberton

[11] 3,835,730
[45] Sept. 17, 1974

[54] HYDRAULICALLY CONTROLLED NON-SLIP DIFFERENTIAL

[76] Inventor: J. C. Pemberton, 9920 Sunset, La Mesa, Calif. 92041

[22] Filed: Aug. 4, 1972

[21] Appl. No.: 278,157

[52] U.S. Cl. .......................... 74/650, 74/710, 192/61
[51] Int. Cl. ............................................. F16h 35/04
[58] Field of Search ................ 74/650, 700; 192/61

[56] References Cited
UNITED STATES PATENTS

| | | | |
|---|---|---|---|
| 2,827,802 | 3/1958 | Burke | 74/710 |
| 3,447,396 | 6/1969 | Seliger | 74/650 |

*Assistant Examiner*—Wesley S. Ratliff, Jr.
*Attorney, Agent, or Firm*—Jessup & Beecher

[57] ABSTRACT

A differential mechanism wherein the power input to the differential is divided and transmitted to dual output axle shafts through a hydraulic pumping assembly, the hydraulic pumping assembly being composed of a separate pump for each axle shaft. The outputs of the two pumps are interconnected through a manually operable valve to close the flow between the outputs of the two pumps. If free fluid flow is permitted between the outputs of the pumps, the differential mechanism functions as a conventional differential. If the flow between the outputs of the two pumps is blocked by the valve, the differential action is deleted and the engine is geared directly to each driving wheel.

6 Claims, 5 Drawing Figures

PATENTED SEP 17 1974
3,835,730
SHEET 1 OF 2
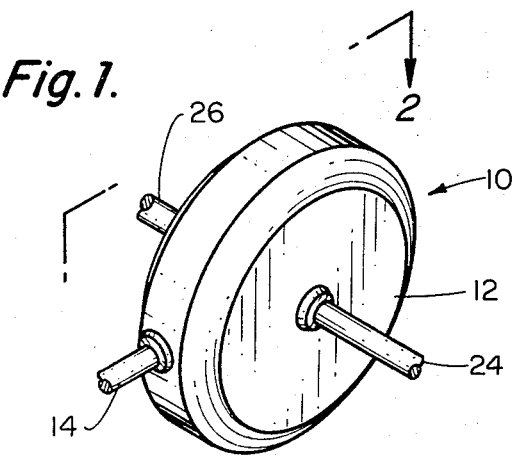
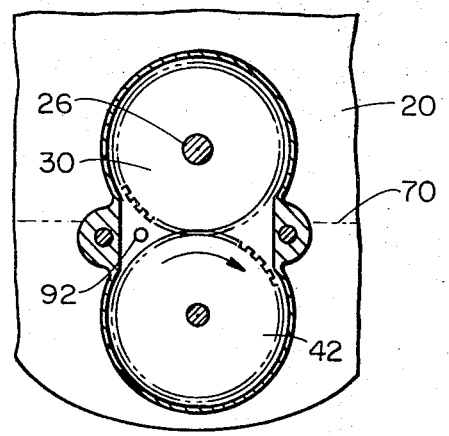
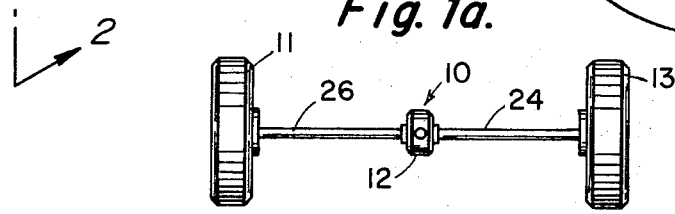
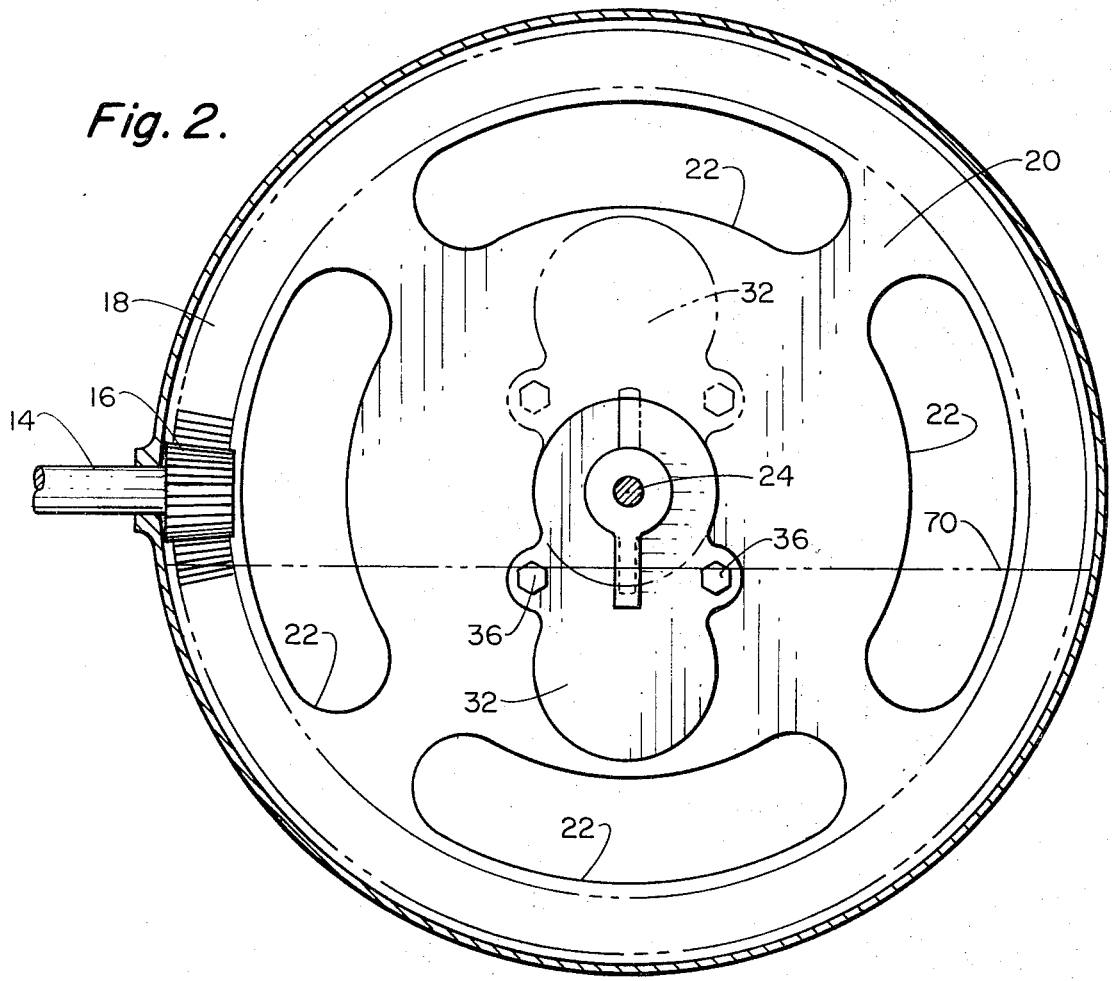

HYDRAULICALLY CONTROLLED NON-SLIP DIFFERENTIAL

BACKGROUND OF THE INVENTION

Most vehicles are what is commonly referred to as four wheel vehicles. It is common within the four wheel vehicles to divide the engine output between two of the four wheels. The mechanism which divides the engine power between the two wheels is what is termed a differential. When the vehicle turns corners, one wheel of the vehicle rolls faster than the other. The differential must be capable of accounting for this difference and the conventional differential does account for this difference by transferring more power to the wheel that is rolling faster and less power to the wheel that is rolling slower. In other words, a conventional differential is capable of varying the angular displacement ratio which is transmitted between the axles.

The conventional differential has one significant disadvantage and that is, if one of the driving wheels of the vehicle is free to spin and not in frictional contact with the roadway, all the power from the engine will be transmitted to the free spinning wheel and dissipated as heat with the result that the vehicle does not move. The other driving wheel which is normally in frictional contact with the roadway receives torque equal to the slipping wheel but does not rotate.

Within recent years a differential structure has been designed which places a spring loaded clutch between the two output axles and causes a braking torque to be applied to the free wheel, so that certain amount of power is transmitted to the wheel that is located on the pavement, thereby causing sufficient movement of the vehicle to place the other driving wheel also on a solid surface. Such non-slip differentials are constructed of a slip clutch which wears continually when the vehicle turns. The presently available non-slip differentials employ friction plates which are constantly in engagement. There is relative movement between these plates whenever there is a variable speed situation between wheels. This occurs every time the vehicle turns a corner. As a result it is not uncommon for these plates to wear out quickly and need to be replaced.

SUMMARY OF THE INVENTION

The apparatus of this invention provides for the torque to be transmitted to the wheel axles through the use of a hydraulic pump. The shown pumping means comprises a pair of gear pumps; however it is not desired to be limited to this specific type of pumping means. The engine drive shaft drives a drive pinion gear which in turn drives a ring gear. A web is located within the ring gear and rotates therewith. A pump housing is located on either side of the web with a drive gear and a driven gear located within each of the pump housings. Each of the drive gears is rotatably mounted upon the web. Each of the driven gears is connected to a respective wheel axle. The outputs of the two pumps are connected together. The intakes of the two pumps extract oil from within the differential housing. Upon rotation of the ring gear and the web, a pumping of oil is possible within each of the pump housings. The oil under pressure results in rotation of its respective driven gear which therefore results in rotation of the driving wheels of the vehicle. However, if one of the driving wheels of the vehicle becomes free spinning, the output of both the pumps will be transmitted to the free spinning wheel resulting in that wheel being rotated, with the other drive wheel of the vehicle not being moved at all. This variation in the speed is necessary when the vehicle is turning corners. However, this particular situation of a wheel free-spinning is not desirable and therefore a manually actuatable valve is located within the web and is capable of blocking the flow of oil between the two output pumps. If the flow between the two pumps is blocked, the result is that both wheels are rotated at the same speed. As a result, neither wheel can "spin" and each is driven at its normal rate with the other driving wheel also being driven at its normal rate. Therefore, sufficient power is being transmitted to the wheel that is located upon hard surface which results in the vehicle being moved sufficiently so that the free spinning wheel will then be caused to come into contact with the hard surface. With the vehicle now on the hard surface, the operator simply reopens the valve and the conventional regular differential action is resumed.

BRIEF DESCRIPTION OF THE DRAWINGS

FIG. 1 is an overall isometric view of the differential housing of this invention;

FIG. 1a is a view showing the differential mechanism connected by the output shafts to wheels of a vehicle;

FIG. 2 is a cross-sectional view through the differential structure of this invention taken along line 2—2 of FIG. 1;

FIG. 4 is a cross-sectional view through one of the pumping units employed within this invention taken along line 4—4 of FIG. 3.

DETAILED DESCRIPTION OF THE SHOWN EMBODIMENT

Figure 3:
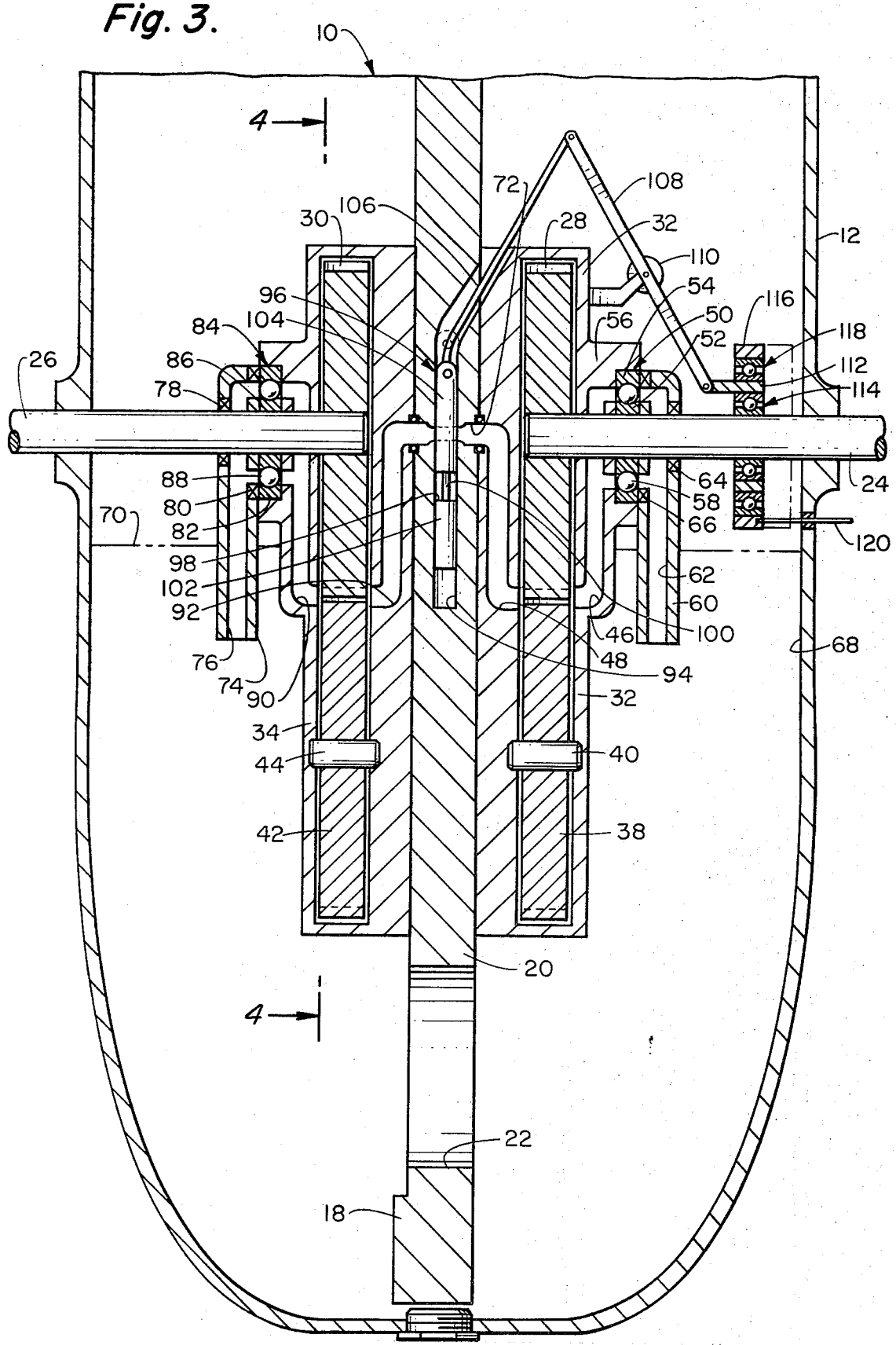
FIG. 3 is a cross-sectional view through the differential mechanism of this invention showing in detail the hydraulic pumping arrangement between the vehicle wheel axles.

Referring particularly to the drawing, there is shown in FIG. 1 the differential mechanism 10 of this invention located within an outer housing 12. An engine (not shown) transmits torque to a drive shaft 14. The drive shaft 14 extends through the outer housing 12 and is connected to a drive pinion gear 16. The drive pinion gear 16 is outwardly connected to a ring gear 18 which is located within the outer housing 12. A web 20 is located internally of the ring gear 18. The web 20 is basically platelike in configuration. It is composed of a material such as steel. A series of holes 22 are located in the web 20 to eliminate weight. Protruding from each side of the housing 12 are axle shafts 24 and 26. It is to be understood that a vehicle wheel 11 is connected to the free end of shaft 26 with a vehicle wheel 13 connected to shaft 24. It is the function of the differential mechanism 10 of this invention to divide and transmit the engine torque from shaft 14 to the shafts 24 and 26 and hence to the vehicle wheels 11 and 13.

Axle shaft 24 has mounted thereon a driven gear 28. Similarly, axle shaft 26 has mounted thereon a driven gear 30. Gear 28 is rotatably supported within a first pump housing 32 with gear 30 being rotatably supported within a second pump housing 34. Each of the pump housings 32 and 34 are fixedly secured upon opposite sides of the web 20. The position of the housings 32 and 34 is such that the axis of the shaft 24 coincides with the axis of the shaft 26. Each of the gears 28 and 30 comprises conventional type of gear construction (such as spur gears) which are normally employed in a conventional gear pump. The securing of the housings 32 and 34 to the web 20 can be by any conventional means such as by the use of bolt fasteners 36.

Located within the housing 32 is a drive gear 38. Gear 38 is rotatably supported by pin 40 with respect to the first pump housing 32. In a similar manner a drive gear 42 is located within the second pump housing 34 and is rotatably supported with respect to the second pump housing 34 by a pin 44. Drive gear 38 is to be in continuous engagement with the driven gear 28 and the drive gear 42 is to be in continuous engagement with the driven gear 30. It is also to be understood that the gears 38 and 42 are basically formed in a conventional manner and are substantially identical to the gears 28 and 30.

Housing 32 includes a fluid inlet 46 and a fluid outlet 48. The fluid inlet conduit 46 communicates with a ball bearing assembly 50. The inner race 52 of the ball bearing assembly 50 is secured to the shaft 24 with the outer race 54 being secured to an extension 56 of the housing 32. There are spaces (not shown) located between adjacent balls 58 of the ball bearing assembly 50. An inlet tube 60, including an inlet conduit 62, is rotatably supported upon the shaft 24 by means of bearing assembly 64. Inlet tube 60 is also rotatably supported by bearing assembly 66 with respect to the outer race 54 of the bearing assembly 50. The inlet conduit 62 communicates with the spaces between adjacent balls 58.

Because of the rotary glands or seals 64 and 66, the inlet tube 60 always remains within the oil sump 68 located within the housing 12. The length of the tube 60 is selected so as to be continuously located beneath the level 70 of oil. The oil is to be conducted from within the sump 68 through the inlet conduit 62 through the spaces located between the balls 58, and into the fluid inlet 46. The oil when located within the fluid inlet is capable of being pumped by the gears 28 and 38 to the outlet 48. The outlet 48 communicates with opening 72 located within the web 20. The axis of the opening 72 is aligned with the axle shafts 24 and 26.

It is to be understood that the gear pump represented by the housing 34 has a substantially identical arrangement of parts which includes the use of an inlet tube 74 having an inlet conduit 76. The tube 74 is rotatably supported by glands or seals 78 and 80 with respect to both the shaft 26 and the outer race 82 of the bearing assembly 84. The inner race 86 of the bearing assembly 84 is secured to shaft 26 with balls 88 being located between the inner and outer races. Spaces are located between the balls 88 which permits the fluid to flow through the inlet conduit 76 and into fluid inlet 90 of the housing 34. The fluid which passes within the conduit 90 is capable of being pumped by the cooperating gears 30 and 42 to a fluid outlet 92. The fluid outlet 92 also communicates with the opening 72 located within the web 20.

Communicating with opening 72 is a transverse opening 94. Movably mounted within the transverse opening 94 is a valve spool 96. Valve spool 96 includes a cut-out section 98. The cut-out section 98 is annular in configuration resulting in the formation of a spindle 100 which is integrally connected between enlarged spool sections 102 and 104. The enlarged spool section 104 is pivotally connected to a fore actuating rod 106. Rod 106 is pivotally connected to a main actuating rod 108. Rod 108 is pivotally supported intermediate its ends upon pivot bracket 110. The pivot bracket 110 is fixedly secured to the first pump housing 32. The free end of the main actuating rod 108 is pivotally connected to a ring 112. The ring 112 is rotatably supported with respect to the shaft 24 by means of bearing assembly 114. The ring 112 is also rotatably supported with respect to an outer ring 116 by means of a bearing assembly 118. The outer ring 116 is adapted to remain fixed with respect to the housing 12. An actuating arm 120 extends through the housing 12 and is connected to the outer ring 116.

The operation of the differential mechanism of this invention is as follows:

For the mechanism 10 to operate as a conventional differential, the valve spool 96 is located so the cut-out section 98 communicates with the opening 72. This permits fluid flow to be conductable between the outlets 48 and 92. Locating of the valve spool in this position is accomplished manually by moving the actuating arm 120 causing the outer ring 116 and the ring 112 to move toward the housing 32. This results in a pivoting of the rod 108 about the bracket 110 resulting in upward movement of the actuating rod 106. This movement of the actuating rod 106 is transferred to the spool 96 which results in cut-out section 98 being communicated with the opening 72.

As the engine power is transmitted to the shaft 14 and effects rotation of the ring gear 18 and its connected web 20, rotation of the housing 32 and 34 also occurs. It will be assumed that both drive wheels of the vehicle are on a solid surface and are both rotating at the same speed. Therefore shafts 24 and 26 are rotating at the same speed. As the housings 32 and 34 rotate, there tends to be relative movement between the housing and its respective gears 28 and 38 or 30 and 42. This relative movement tends to pump fluid through its respective inlet 46 or 90 into its respective outlet 48 or 92. However, because of the location of the valve spool 96, the outlets 48 and 92 communicate with each other. Since both of the vehicle wheels are on hard ground, the engine power transmitted from shaft 14 is divided equally between the axle shafts 24 and 26. This results in no fluid flow between the outlets 48 and 92. This lack of fluid flow therebetween results in fixing of the gears 28 and 38 with respect to the housing 32 and also a fixing of the gears 30 and 42 with respect to the housing 34. Therefore, as the housings 32 and 34 continue to rotate, this movement is transferred directly to the axle shafts 24 and 26.

Let it now be assumed that one of the vehicle wheels is no longer communicating with the hard surface and it is free to spin. Let it be assumed that it is the shaft 24 that is free to spin. It is also to be assumed that the valve spool 96 is located in the position so that the outlets 48 and 92 communicate with each other. Pressurized fluid located within the conduits 48 and 92 will move toward the path of least resistance. If there is no resistance upon the shaft 24, the fluid will be conducted from the outlet 92 into the outlet 48 and effect rotation of the gears 28 and 38 above the normal level of rotation. In essence, the gears 28 and 38 located within the first pump housing 32 are now actuating as a gear motor. Assuming that the wheel on the axle 26 is located upon a hard surface, the axle 24 is being rotated with the axle 26 not being rotated at all. In essence, fluid is being removed from the sump 68, into the conduit 76, and conducted through the bearing assembly 84 into the inlet 90. This fluid is then being pumped by the gears 30 and 42 within the chamber located within the housing 34. This pumped fluid is conducted into the outlet 92 past the spindle 100 of the valve spool 96 and into the outlet 48. This pressurized fluid effects further rotation of the gears 28 and 38 with the fluid passing into the intake 46 and into conduit 62 and back into the sump 68.

This just previously described arrangement would be what occurs if the wheel connected to the axle shaft 24 was located within a mud hole or free to spin in air or some other similar situation. Since no power is being transmitted to the shaft 26, the vehicle will not move. Such an arrangement is clearly undesirable.

To avoid this undesirable situation, the operator of the vehicle actuates the arm 120 and causes movement of the rings 116 and 112 away from the housing 32. This results in a counter pivoting of the rod 108 resulting in longitudinal movement of the rod 106 which moves the valve spool 96 so that the enlarged spool section 104 extends across the opening 72. Therefore, fluid flow between the outlets 48 and 92 is prevented.

With this flow being prevented, the oil located within the outlet 92 has no means of escape. The gears 32 and 42 again become fixed relative to the housing 34. Therefore, as the web 20 and the housing 34 continue to rotate, this rotational movement is transferred to the shaft 26. This rotational movement is then supplied to its respective drive wheel of the vehicle. This power, under normal circumstances, which is being supplied to the wheel will be sufficient to move the vehicle out of the undesirable situation until the wheel connected to the shaft 24 is again located upon a hard surface. At that time, the wheel connected to the shaft 24 assists in the driving of the vehicle.

Once the freely spinning wheel is again located upon the hard surface, the operator may then operate arm 120 so as to move the ring 116 and 112 toward the housing 32. This results in movement of the valve spool 96 so that the cut-out section 98 again communicates with the opening 72. The differential mechanism 10 is then in the position of a conventional differential and operates in the manner as previously described.

What is claimed is:

1. In combination with a motor vehicle having a first driving wheel and a second driving wheel, a single power source located within said vehicle, a differential mechanism to receive the power from said power source and divide such between said first driving wheel and said second driving wheel, said differential mechanism comprising:
    a housing;
    an oil sump located within said housing;
    means for dividing the power from said power source into a first output power and a second output power, said first output power driving said first wheel, said second output power driving said second wheel,
    said means including a fluid power transmitting device having a first pumping device and a second pumping device, the fluid outlets of both said pumping devices being connected together through a connecting means, said outlet of said first pumping device only capable of discharging into said outlet of said second pumping device, said outlet of said second pumping device only capable of discharging into said outlet of said first pumping device, whereby as long as the power from said power source is divided equally between said first and second driving wheels, said first and second pumping devices are inoperative, whereby upon the power from said power source being unequally divided between said first and second driving wheels said first and second pumping devices to exchange fluid therebetween.

2. In combination with a motor vehicle having a first driving wheel and a second driving wheel, a single power source located within said vehicle, a differential mechanism to receive the power from said power source and divide such between said first driving wheel and said second driving wheel, said differential mechanism comprising:
    a housing;
    an oil sump located within said housing;
    means for dividing the power from said power source into a first output power and a second output power, said first output power driving said first wheel, said second output power driving said second wheel,
    said means including a fluid power transmitting device having a first pumping device and a second pumping device, the outlets of both said pumping devices being connected together through a connecting means,
    valve means in said connecting means for selectively restricting oil flow in said connecting means, whereby as the oil flow is restricted the pumping action of said pumping devices is restricted causing said pumping devices to act independently, whereby if one of said driving wheels has lost traction the other of said driving wheels is rotatably driven.

3. In combination with a motor vehicle having a first driving wheel and a second driving wheel, a single power source located within said vehicle, a differential mechanism to receive the power from said power source and divide such between said first driving wheel and said second driving wheel, said differential mechanism comprising:
    a housing;
    an oil sump located within said housing;
    means for dividing the power from said power source into a first output power and a second output power, said first output power driving said first wheel, said second output power driving said second wheel,
    said means including a fluid power transmitting device having a first pumping device and a second pumping device, the outlets of both said pumping devices being connected together through a connecting means,
    a ring gear located within said housing and having a web secured to and located interiorly of said ring gear,
    said first pumping device being located on one side of said web,
    said second pumping device being located on the opposite side of said web.

4. The combination of claim 3 wherein:

said connecting means comprises a conduit located within said web.

5. The combination of claim 2 including:
said valve means comprising a valve spool located within said web and movable between a first position and a second position.

6. The combination of claim 5 including:
a linkage assembly connected to said valve spool and manually actuatable to effect movement of said valve spool between said first position and said second position.

* * * * *